(12) United States Patent
Chiang

(10) Patent No.: US 7,921,503 B1
(45) Date of Patent: Apr. 12, 2011

(54) STRUCTURE OF WINDSHIELD WIPER

(75) Inventor: Min-Heng Chiang, Wujie Township, Yilan County (TW)

(73) Assignee: Fu Gang Co., Ltd., Yilan County (TW)

( * ) Notice: Subject to any disclaimer, the term of this patent is extended or adjusted under 35 U.S.C. 154(b) by 12 days.

(21) Appl. No.: 12/609,018

(22) Filed: Oct. 30, 2009

(51) Int. Cl.
*B60S 1/38* (2006.01)
*B60S 1/40* (2006.01)

(52) U.S. Cl. .................................. 15/250.32; 15/250.44

(58) Field of Classification Search ............... 15/250.32, 15/250.44, 250.43, 250.31, 250.46, 250.361, 15/250.201
See application file for complete search history.

(56) References Cited

U.S. PATENT DOCUMENTS

| | | | | |
|---|---|---|---|---|
| 4,343,064 A | * | 8/1982 | van den Berg et al. | 15/250.32 |
| 5,435,041 A | * | 7/1995 | Ho | 15/250.32 |
| 6,609,267 B1 | * | 8/2003 | Journee et al. | 15/250.32 |
| 7,506,401 B2 | * | 3/2009 | Park | 15/250.32 |
| 2006/0064841 A1 | * | 3/2006 | Nakano | 15/250.201 |
| 2007/0226940 A1 | * | 10/2007 | Thienard | 15/250.32 |

* cited by examiner

*Primary Examiner* — Gary K Graham
(74) *Attorney, Agent, or Firm* — Leong C. Lei

(57) ABSTRACT

A windshield wiper includes a blade assembly, which has a primary frame member having opposite ends to which secondary frame members are respectively connected. The primary frame member forms a central opening delimited by two side walls. A retain carrying a positioning bar is received in the opening. An arm coupler is received in the opening and has an inner wall section and an outer wall section through which mounting holes are defined. Fixing pawls extend downward from the inner wall section to engage the retainer for fixing the arm coupler. The mounting holes serve to couple to a wiper arm of a vehicle for driving reciprocal motion of the windshield wiper. The arm coupler can be mounted to the primary frame member in different directions so that the windshield wiper is suitable for both left hand drive vehicles and right hand drive vehicles.

4 Claims, 5 Drawing Sheets

US 7,921,503 B1

STRUCTURE OF WINDSHIELD WIPER

TECHNICAL FIELD OF THE INVENTION

The present invention generally relates to a vehicle windshield wiper, and more particularly to a structure of the windshield wiper that allows for easy assembling and is suitable for vehicles of both left hand drive and right hand drive.

DESCRIPTION OF THE PRIOR ART

A known windshield wiper has a structure as shown in FIG. 1 of the attached drawings, which comprises a primary frame member 11, two intermediate frame members 12 connected to the primary frame member 11, and four minor frame members 13 connected to the two intermediate frame members, and a wiper blade 14 attached to the pawls formed on the frame members. The primary frame member 11 comprises an arm coupler 111 at a central portion thereof for coupling with a wiper arm of a vehicle for driving reciprocal motion of the windshield wiper. The known structure of the windshield wiper is only suitable for vehicles of a fixed driver seating position, such as a left hand drive vehicle or a right hand drive vehicle. For vehicles of different driver seating position, different molds must be prepared for manufacturing windshield wipers of different driver seating position vehicles. This reduces the manufacturing performance and increases the manufacturing costs. Thus, it is desired to have an improved structure of windshield wiper that overcomes the above problems by allowing for easy assembling and being suitable for vehicles of different driver seating positions, which lead to improved manufacturing performance and reduction of manufacturing costs.

SUMMARY OF THE INVENTION

The primary objective of the present invention is to provide an improved structure of windshield wiper that allows for easy assembling and also allows for use in both left hand drive vehicles and right hand drive vehicles to thereby reduce the manufacturing costs of the windshield wipers.

According to the present invention, a windshield wiper comprises a blade assembly, which has a primary frame member having opposite ends to which secondary frame members are respectively connected. The primary frame member forms a central opening delimited by two side walls. A retain carrying a positioning bar is received in the opening. An arm coupler is received in the opening and has an inner wall section and an outer wall section through which mounting holes are defined. Fixing pawls extend downward from the inner wall section to engage the retainer for fixing the arm coupler. The mounting holes serve to couple to a wiper arm of a vehicle for driving reciprocal motion of the windshield wiper. The arm coupler can be mounted to the primary frame member in different directions so that the windshield wiper is suitable for both left hand drive vehicles and right hand drive vehicles.

In the windshield wiper discussed above, the side walls of the primary frame member form curved through slots to provide the side walls with flexibility that facilitates engagement/disengagement of the fixing pawls of the arm coupler.

In the windshield wiper discussed above, the fixing pawls of the arm coupler form spacing with the inner wall section and also form spacing between adjacent fixing pawls, whereby the fixing pawls are made in a cantilevered form that provides the fixing pawls with flexibility.

The foregoing objectives and summary provide only a brief introduction to the present invention. To fully appreciate these and other objectives of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
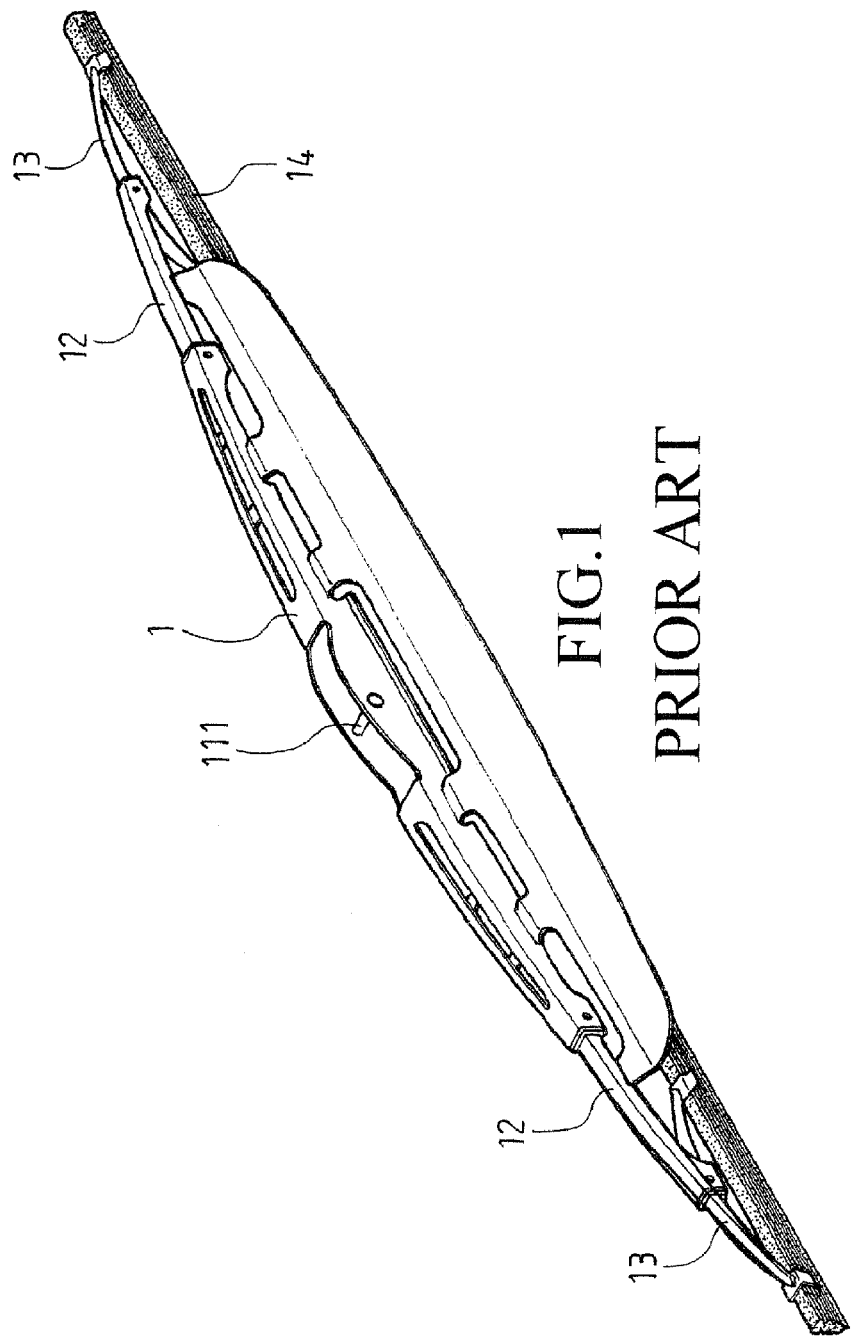
FIG. 1 is a perspective view showing a conventional windshield wiper.
Figure 2:
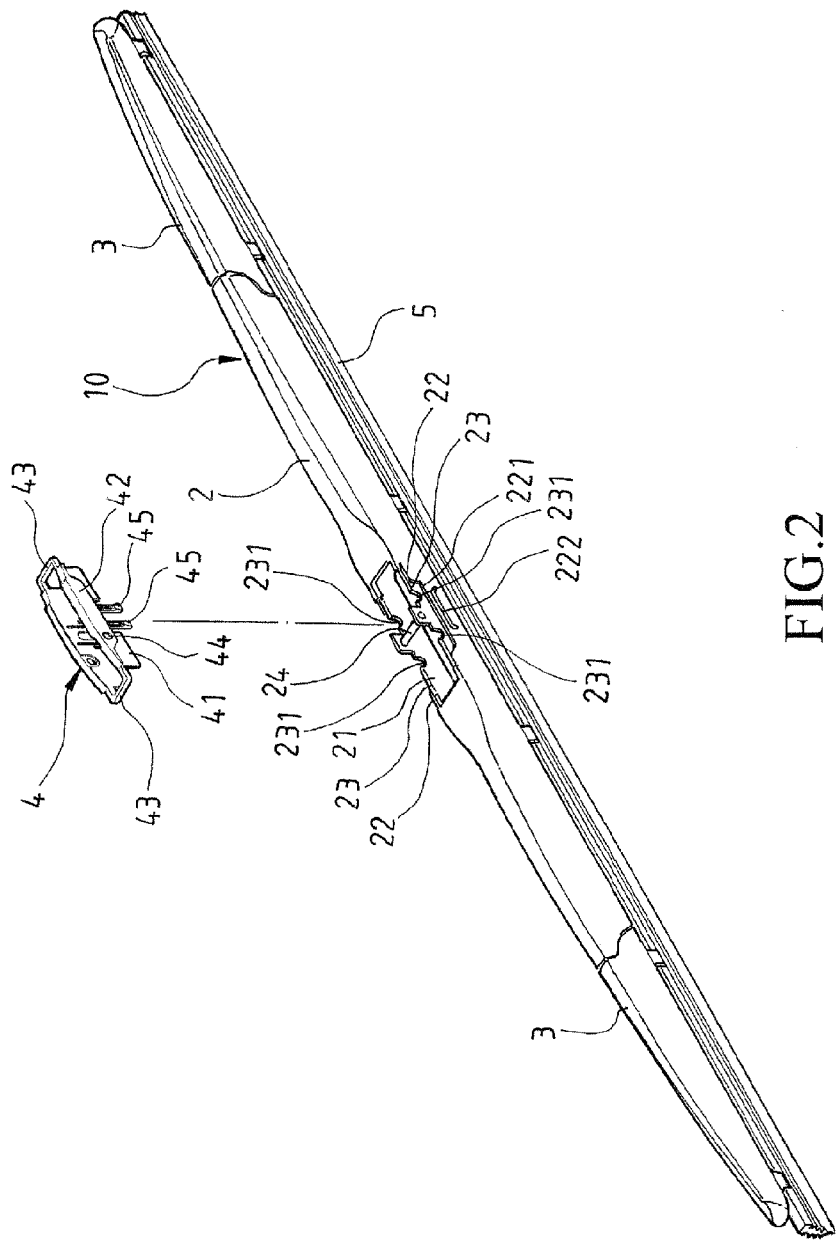
FIG. 2 is a perspective view, in an exploded form, of a windshield wiper constructed in accordance with the present invention.
Figure 3:
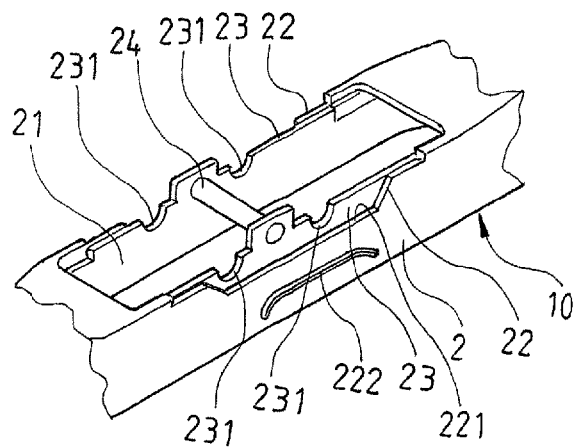
FIGS. 3 and 4 are perspective views showing a structure of a primary frame member of the windshield wiper of the present invention.
Figure 4:
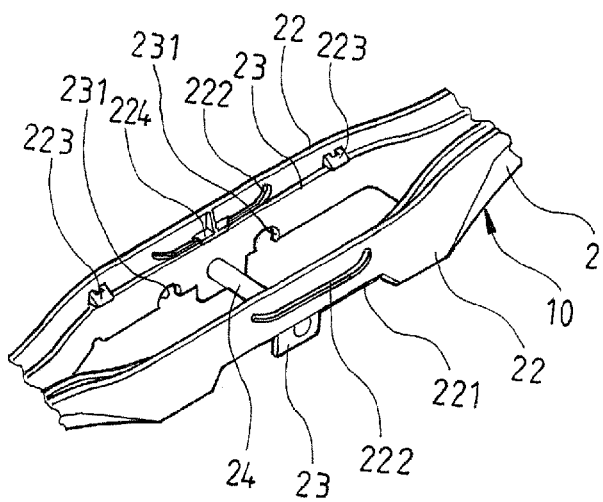
Figure 5:
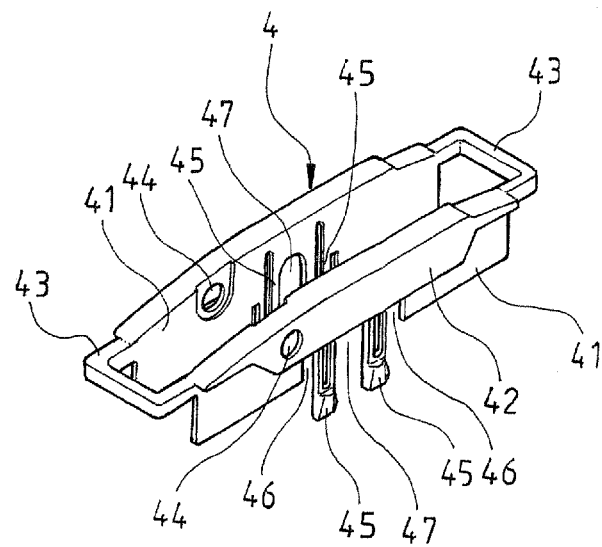
FIGS. 5 and 6 are perspective views showing n arm coupler of the windshield wiper of the present invention.
Figure 6:
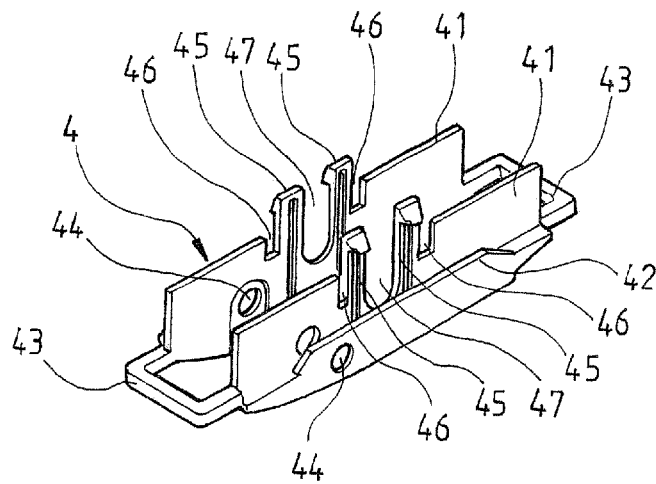

With reference to the drawings and in particular to FIG. 2, which shows a perspective view, in an exploded form, of a windshield wiper constructed in accordance with the present invention, FIGS. 3 and 4, which show a structure of a primary frame member of the windshield wiper of the present invention, and FIGS. 5 and 6, which show an arm coupler of the windshield wiper of the present invention, the windshield wiper in accordance with the present invention comprises a blade assembly 10 and an arm coupler 4 that couples the blade assembly 10 to a wiper arm of a vehicle (both not shown). The blade assembly 10 comprises a primary frame member 2 having two opposite ends to which two secondary frame members 3 are respectively connected and a wiper blade 5 that is attached to a lower edges of the primary frame member 2 and the secondary frame members 3. The primary frame member 2 has a central portion in which an opening 21 is formed. The opening 21 is delimited by two side walls 22 and a retainer 23 received in the opening 21. Each side wall 22 has an upper edge that forms a recessed cut-off 221. A positioning bar 24 is formed in a central portion of the retainer 23, preferably extending between two side panels of the retainer 23 and exposed through the opening 21 of the primary frame member 2. The two side panels of the retainer 23 have upper edges respectively defining two semi-circular notches 231 on opposite sides of and adjacent to the positioning bar 24.

Each side wall 22 has a lower portion through which a curved slot 222 is defined to provide the side wall 22 with flexibility. The side walls 22 also form on inside surfaces thereof inward-projecting barbs 223, 224 at suitable locations. The side panels of the retainer 23 are sized to have lower edges thereof engaging the barbs 223, 224 so as to position and fix the retainer 23 between the side walls 22 of the primary frame member 2.

The arm coupler 4 has opposite side walls, each composed of an inner wall section 41 and an outer wall section 42 spaced from each other to define a receiving channel therebetween, and two end connection sections 43 that connect between the two side walls at opposite ends. Aligned mounting holes 44 are defined through both the inner and outer wall sections 41, 42 for each side wall of the arm coupler 4. A plurality of fixing pawls 45, which are two in the embodiment illustrated, extends downward from a lower edge of each inner wall section 41 of the arm coupler 4. These fixing pawls 45 define spacing 46 between each fixing pawl 45 and the inner wall section 41 and spacing 47 between the adjacent fixing pawls 45 in order to provide the fixing pawls 45 with flexibility.

In assembling, the arm coupler 4 is fit over the positioning bar 24 of the primary frame member 2 of the blade assembly 10 with the fixing pawls 45 straddling on the positioning bar 24, so that the arm coupler 4 is received and positioned in the opening 21 of the primary frame member 2. The arm coupler 4, which is received in the opening 21 of the primary frame member 2, is fixed in position by the fixing pawls 45 engaging lower edges of the side panels of the retainer 23 of the primary frame member 2. The mounting holes 44 of the arm coupler 4 serves to receive corresponding portions of the wiper arm so as to mount the blade assembly 10 to the wiper arm to allow the blade assembly 10 to be driven by the wiper arm for reciprocal motion in wiping the windshield of the vehicle.

The windshield wiper of the present invention can be mounted to the windshields of vehicles of different driver seating positions, including left hand drive vehicles and right hand drive vehicles. To switch from for example the left hand drive vehicle to a right hand drive vehicle, the arm coupler 4 is first removed from the primary frame member 2 and is then switched in direction and re-mounted back to the primary frame member 2. The semi-circular notches 231 are defined in each side panel of the retainer 23 in both sides of the positioning bar 24 at such locations as to align with the mounting holes 44 of the arm coupler 4 to facilitate mounting of the blade assembly 10 to the wiper arm and the arrangement of the notches 231 on both sides of the positioning bar 24 allows the blade assembly 10 to be suitable for vehicles of both left hand drive and right hand drive.

Figure 7:
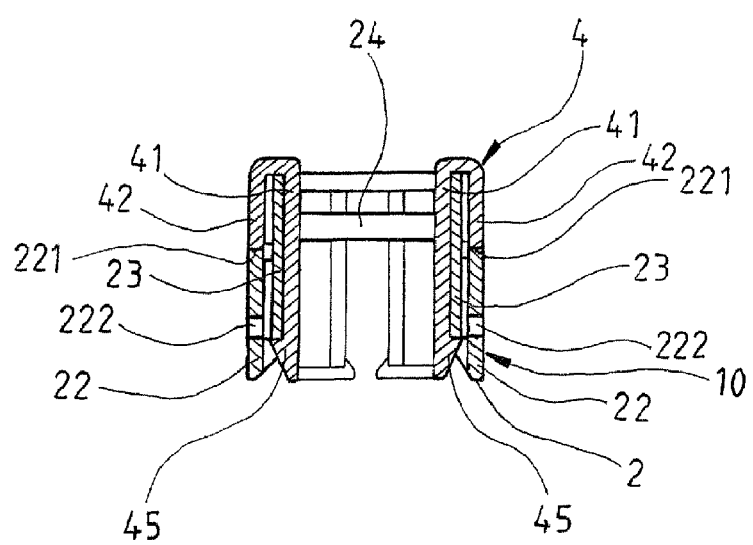
FIG. 7 is a cross-sectional view of the windshield wiper of the present invention in an assembled form.

Referring to FIG. 7, which shows a cross-sectional view of the windshield wiper of the present invention in an assembled form, the windshield wiper of the present invention is assembled so that the arm coupler 4 is received and positioned in the opening 21 of the primary frame member 2 by means of the fixing pawls 45 fit over the positioning bar 24 of the primary frame member 2 of the blade assembly 10 and the outer wall sections 42 of the arm coupler 4 are respectively received in the cut-offs 221 of the side walls 22 of the primary frame member 2 whereby the arm coupler 4 is fixed in position by the fixing pawls 45 engaging the lower edges of the side panels of the retainer 23 of the primary frame member 2. The windshield wiper so assembled is attachable to the wiper arm of a vehicle by the mounting holes 44 of the arm coupler 4 receiving and coupling corresponding portions of the wiper arm to allow the blade assembly 10 to be driven by the wiper arm for reciprocal motion to wipe the windshield of the vehicle. The spacing 46 between the fixing pawls 45 and the inner wall sections 41 and the spacing 47 between the adjacent fixing pawls 45 make the fixing pawls 45 in a cantilevered form that provides flexibility of deflection of the pawls 45 to facilitate the movement of the pawls 45 is fitting the arm coupler 4 into the opening 21 of the primary frame member 2 and engagement of the fixing pawls 45 with the lower edges of the retainer 23. To be used in vehicles of different driver seating positions, such as vehicles of left hand drive and vehicles of right hand drive, the arm coupler 4 is first removed from the primary frame member 2 and is then switched in direction and re-mounted back to the primary frame member 2. Due to the curved slots 222 formed in the lower portions of the side walls 22 of the primary frame member 2, the side walls 22 are provided with suitable flexibility in deflection. Thus, removal of the arm coupler 4 from the primary frame member 2 is made easy by the flexibility of the side walls 22 of the primary frame member 2.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A windshield wiper, comprising:
   a blade assembly, which comprises a primary frame member having two opposite ends to which two secondary frame members are respectively connected, the primary frame member having a central portion in which an opening is formed and is delimited by two side walls, a retainer being received in the opening, each of the side walls of the primary frame member having an upper edge that forms a recessed cut-off, the retainer comprising a positioning bar formed in a central portion of the retainer and having an upper edge defining two semi-circular notches on opposite sides of and adjacent to the positioning bar; and
   an arm coupler, which has an inner wall section and an outer wall section spaced from each other to define a channel therebetween and two end connection sections that connect to ends of the wall sections, aligned mounting holes being defined through the inner and outer wall sections, fixing pawls extending downward from the inner wall section;
   wherein the arm coupler is received in the opening of the primary frame member and is fixed in position by the fixing pawls engaging the retainer of the primary frame member, whereby with the mounting holes of the arm coupler couple a wiper arm of a vehicle, the blade assembly is driven by the wiper arm for reciprocal motion and wherein to be used in vehicles of different driver seating positions, the arm coupler is first removed from the primary frame member and is then switched in direction and re-mounted back to the primary frame member to thereby allow the blade assembly to be used in either left hand drive vehicles or right hand drive vehicles.

2. The windshield wiper according to claim 1, wherein the side walls of the primary frame member have lower portions that form curved through slots to provide the side walls with flexibility that facilitates engagement/disengagement of the fixing pawls of the arm coupler.

3. The windshield wiper according to claim 1, wherein the side walls of the primary frame member form inward-projecting barbs at suitable location and wherein the retainer has a lower edge engageable by the barbs for positioning the retainer.

4. The windshield wiper according to claim 1, wherein the fixing pawls of the arm coupler form spacing with the inner wall section and also form spacing between adjacent fixing pawls, whereby the fixing pawls are made in a cantilevered form that provides the fixing pawls with flexibility to facilitate mounting/dismounting of the arm coupler into/from the primary frame member.

* * * * *